UNITED STATES PATENT OFFICE.

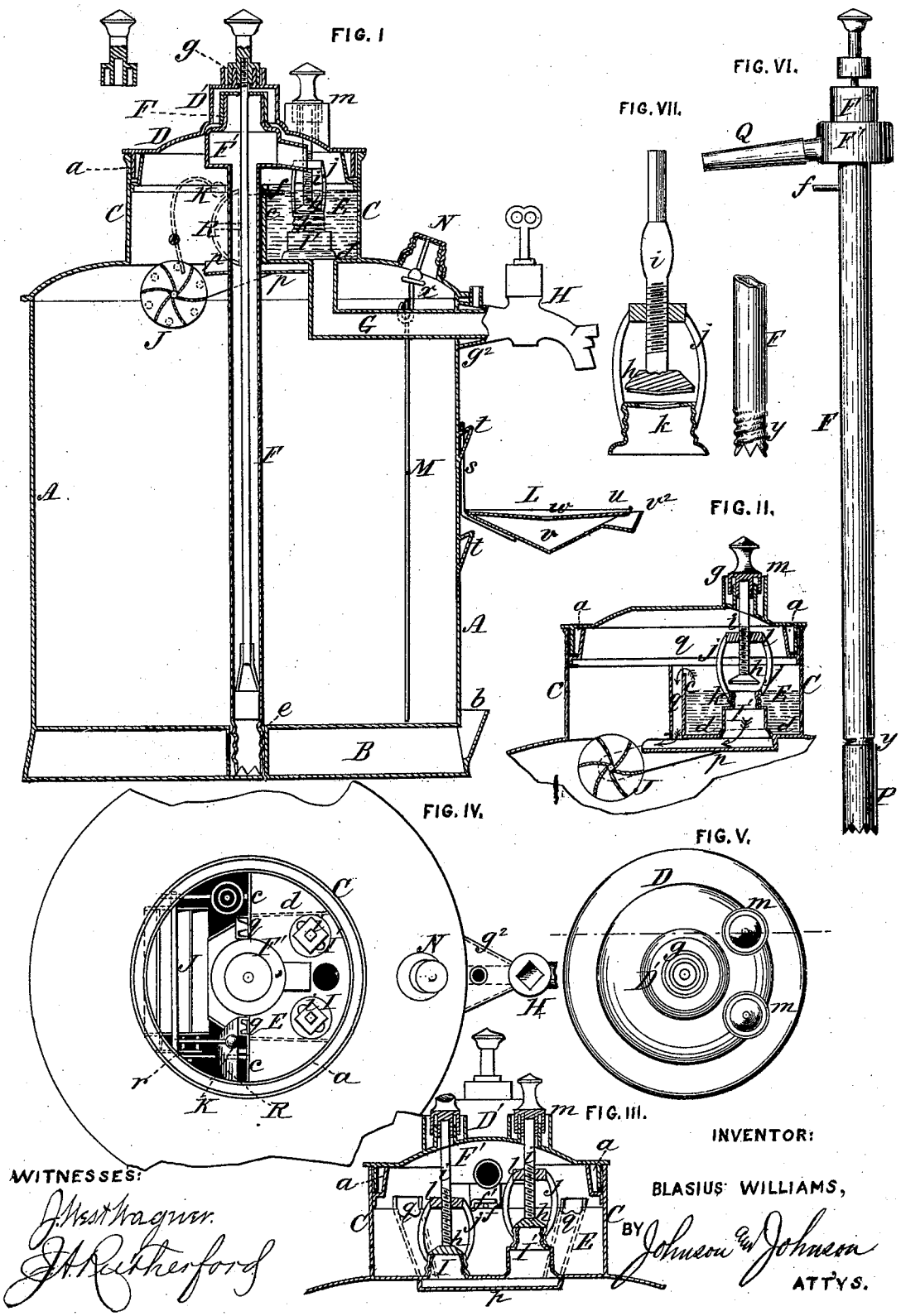

BLASIUS WILLIAMS, OF MARSHALL, TEXAS.

IMPROVEMENT IN LIQUID-MEASURING TANKS.

Specification forming part of Letters Patent No. 181,510, dated August 22, 1876; application filed May 19, 1876.

*To all whom it may concern:*

Be it known that I, BLASIUS WILLIAMS, of Marshall, in the county of Harrison and State of Texas, have invented certain new and useful Improvements in Liquid-Measuring Tank-Can, of which the following is a specification:

My improved measuring tank-can is designed to be both air-tight and fire-proof, and is specially adapted for containing and measuring illuminating-oils.

The tank-can has a top compartment, forming a measure, and within which are arranged gage-nipples, adapted for ascertained measures of a less quantity; and their regulation is effected outside of the tank-can at any time, day or night, and without requiring inspection.

The top compartment forms the receiver and measure for the liquid from the pump, and communicates with the outlet-pipe, while the gages rise from the bottom of the compartment like nipples, and by their height therein is determined the quantity to be measured. The surplus oil passes out from the measure or through the gage-nipples into the tank-can, leaving the ascertained measure to be drawn off from the compartment by opening the outlet-cock. The top compartment is adapted to measure a gallon, while the gage-nipples therein are adapted for less measures, so that the compartment, being a measure of itself, also contains raised nipples for determining divisions of that measure.

I have combined with the measuring-compartment and its inclosed raised measure-gages an alarm, arranged inside of the tank-can, and operated by the surplus liquid from the measuring-compartment, which, for this purpose, opens into the tank-can at the top of such compartment, while the gages have the same communication at and through the bottom of the measuring-compartment, such surplus passing back into the tank in a manner to operate by its weight a device for giving the alarm. By this combination and adaptation of measures in connection with an alarm, there is no spilling of the oil.

The pump passes to the bottom of the tank-can, and delivers the oil into the measuring-compartment at the top, and all surplus, no matter how long the pump is worked, runs back into the tank, leaving the required measure in one chamber only, and that, whatever the quantity may be.

In connection with the gage-nipples, I employ valves, by which they are opened and closed by valve-stems passing through the top of the tank; and, for the purpose of rendering the openings in the tank-top through which these valve-stems pass air-tight, they are provided with suitable sealing-caps, which also serve as keys by which to open and close the gage-valves. The pump-stock is likewise provided with a sealing-cap where it passes through the tank-top. The top cover also fits in place with a sealing-joint; and the bottom of the tank is made double, and filled with water, thus rendering the tank air-tight and fire-proof by sealing all the outside openings with water. The working of the pump, however, gives sufficient air within the tank to cause the oil to run freely.

A movable extension is provided for the pump by which to adapt it to pump the oil into the tank-can direct from the barrel.

In the claims I shall point out particularly the features of my invention.

In the accompanying drawings, Figure 1 represents a vertical section of a tank-can embracing my invention, and in which the measure is shown as filled to its maximum, and ready to be drawn through the cock; Fig. 2, a similar section of the upper portion of the tank, showing the measure as determined by one of the gage-nipples, the gage-valve being open; Fig. 3, a similar section at right angles to Fig. 2; Fig. 4, a top view with the cover removed; Fig. 5, a top view of the cover; Fig. 6, a view of the pump with its extensible section, to adapt it for filling the tank from the barrel, and Fig. 7 one of the gage-valves and caps.

The tank A is made of suitable size, and has a double bottom, B, which is kept filled with water through a side opening, $b$, while its top portion is reduced in diameter to form a neck-extension, C, which is fitted with a cover, D, having a water-sealed joint, the top of the neck being provided with an annular groove, $a$, for that purpose, so that the most exposed parts of the tank have water-protection. The neck-extension C is divided by a vertical partition, c, which, with the bottom d, forms a top compartment, E, and is the receiver and the measure for the liquid.

The pump-stock F stands vertical, with its lower end in a depression, e, in the double bottom, to allow all the oil to be drawn out, while the upper end has a chambered nozzle, F', by which to deliver the oil into the measure, a pin, f, serving to lock the pump by a loop, f', in the vertical partition.

The sucker-rod passes through a central extension, D', of the cover, which extension is provided on top with an annular chamber, g, to receive a screw sealing-cap and form a water-joint. The chamber F of the pump rises into the cover-neck D', to give room for such chamber and its nozzle above the vertical partition, to which the pump-stock is locked. A screw-cap, $F^2$, closes the top of the pump-chamber. An outlet-pipe, G, communicates with the bottom of the measuring-compartment, and, passing out of the tank near its top, is provided with a cock, H, of any desired construction. This pipe has a double casing, $g^2$, at its junction with the tank, and which is kept filled with water. The receiver and measure E form the maximum measure, while gage-nipples rising from its bottom form the graded measures, regulated by the height at which they stand within the receiver.

As in this example, the gage nipple I, Fig. 3, of least height, may represent the lowest measure, and I' a measure between the least and the greatest. They are adapted to measure a gallon, half-gallon, quart, and more or less, if desired, and all within the same receiving-measure within the top of the tank, by combining with such measure and the gage-nipples a communication or passage from each into the tank, whereby to return the surplus oil pumped into the receiver, and leave only the exact measure desired therein. This is very simple, for it is plain that as the several gage-nipples open into the same receiver, they must, when open, let out the liquid by overflow to a level with the open tops. To obtain the different measures, however, it is necessary that they should be provided with means for opening and closing them, so that the desired quantity can be measured in the night as well as in the day, without inspection. This I accomplish by valves h, carried by vertical screw-stems i, which pass through the tank-cover, and are held in position by skeleton frames j, provided with flaring screw-caps k, which screw upon the gage-nipples, while the tops of such frames have screw-nuts l, through which the valve-stems pass, and, by turning which, raise and lower said valves, so as to open and close the open ends of the gage-nipple caps, and by this means I obtain a direct support for the valves, directly upon and over the gage-nipples. The flaring ends of these nipple-caps fit with close joints upon the enlarged base of the nipples, and by this construction washers can be placed upon the nipples, by which to adjust the height of their caps k from the bottom of the measure, to give the exact measure. The openings in the cover, through which the valve-stems pass, are provided with raised annular chambers m, to contain water, and within which the key-caps have angular sockets, which fit upon the angular stems of the valves. Any suitable means for sealing these valve-stems, however, may be adopted.

To determine when the surplus oil has all passed out of the measure, and the right quantity is ready to be drawn out, I utilize the surplus oil to make the alarm, by combining with the measure a double bottom or chute, p, arranged to receive the overflow from the measure E, at the top of the partition, when the gage-nipples are closed, and conduct it by tubes q upon the chute, while the overflow from the gage-nipples, when open, also passes over said chute, and this surplus, whether passing out at the top of the measure or through the gage-nipples, according to the measure desired, is delivered upon a wheel, J, or other suitable device, and cause it to be turned or operated by the weight of the surplus oil, and, by tripping a bell-hammer, K, combined with such wheel or moving device, give notice that the measured oil is ready to be drawn out, and the cock is turned. This alarm device is arranged within the tank, and does not interfere with any thing, or in filling the tank, or pumping out the oil.

As shown, the wheel of buckets J is mounted upon a horizontal shaft supported from the measuring-compartment, just below the neck-extension of the tank, and the gong R is secured to the outside of the partition c, with the hammer-lever K in position to be operated by pins r from the end of the wheel. The wheel-buckets deliver the surplus back into the tank.

All the parts can be easily got at and kept in order.

The drip-pan L is suspended by a hanger, s, to brackets t on the side of the tank, by which it can be raised and lowered in relation to the outlet-cock. It has a rim, u, and a double bottom, v, with a hole, w, in its top to let the dripping into the double bottom, and from which they can be emptied by a spout, $v^2$, into the tank-top opening by removing the screw-cap N. Through this opening the tank may be filled, if desired, and by means of a measure-gage, M, suspended by a link-swivel coupling, x, to the cap N, the quantity in the tank may be ascertained at any time.

I have, however, combined with the pump means for adapting it for use in the barrel for the purpose of filling the tank therefrom. This consists in providing the lower end of the pump-tube with a screw-thread, y, and combining therewith a removable extension, P, of a length adapted to rest upon the inside of the barrel, while an extension-nozzle, Q, serves to deliver the oil into the tank by removing the cover, if desired. By these extensions the same pump can be adapted for different-sized tanks.

The depression e, in the double-tank bottom, beside serving as a drain-cell, also serves as a center hold for the valved end of the pump, and in connection with locking-pin $f$ at the top maintains the pump in position at the bottom laterally, and at the top against the tendency to rise with the action of the sucker-rod. The tank is practically sealed from the air, and protected from danger of explosion, and the floor from the oil. The pump and nozzle extensions are stored in the tank when not in use.

I claim—

1. In a measuring tank-can, the combination of the measuring-chamber and an alarm device, operated by the overflow from said chamber, both chamber and alarm being within the tank in such proper mechanical relation as to effect the purposes stated.

2. The gage-thimbles I I', arranged upon and rising from the bottom of the receiving and measuring chamber E, in combination with the caps $k$ and the valves $h$, substantially as and for the purpose herein set forth.

3. The neck C, formed with the tank A, having measuring-chamber E therein, and combined with the pump F F', said measuring-chamber E being directly within, and forming a part of, the body of the tank, substantially as herein set forth.

4. The combination, with the gage-nipples I I', and their screw valve-stems $i$, of the skeleton screw-holders, and their base-caps $k$, and adapted to screw upon said gage-nipples, for the purpose stated.

5. The combination, with the top measuring-compartment E, and the gage-nipples I I', arranged therein, and each provided with an overflow or outlet passage, as described, of the chute $p$ communicating with such outlets, the turning-bucket device J, and the alarm K, operated thereby, whereby the passage of the surplus oil back into the tank is made the means for giving the alarm of the desired measure.

6. The combination, with the surplus-discharging chute $p$, arranged beneath the measure of the receiving wheel, of buckets J, the pivoted bell-hammer K operated thereby, and the alarm-gong R, supported upon the measure-partition $c$, all arranged for co-operation within the tank beneath its cover.

7. The locking device $f\ f'$, for holding the pump down, in combination with the bottom guide-depression $e$, whereby the pump is kept from turning, and is locked against vertical movement.

8. The combination, with a measuring-tank, A C, constructed substantially as herein described, of the bottom chamber B, the top sealing-grooves $a\ m\ g$, the cover D, pump-rod cap, the valve-rod key-caps, and the draft-cock jacket $g^2$, all constructed as and for the purpose set forth.

9. The combination, with the screw-cap N in the tank, of the gage-rod M, connected to said cap by a swivel-link coupling, $x$, to allow the cap to be screwed on and off, with the gage-rod connected thereto.

10. The pump-tube F, provided with the screw-thread $y$, and combined for use with screw tubular extension-section P, and the nozzle-extension Q, to adapt the pump for filling the tank, as described.

In testimony whereof I have affixed my signature in the presence of two witnesses.

BLASIUS WILLIAMS.

Witnesses:
J. H. VAN HOOK,
R. H. COOPER.